(12) United States Patent
Araki et al.

(10) Patent No.: US 6,382,016 B1
(45) Date of Patent: May 7, 2002

(54) WATER CUT-OFF INSPECTION DEVICE FOR GROMMET

(75) Inventors: Yoshihiro Araki; Katsumi Furukawa; Yoshitsugu Fujita, all of Yokkaichi (JP)

(73) Assignee: Sumitomo Wiring Systems, Ltd. (JP)

( * ) Notice: Subject to any disclaimer, the term of this patent is extended or adjusted under 35 U.S.C. 154(b) by 0 days.

(21) Appl. No.: 09/732,594

(22) Filed: Dec. 8, 2000

(30) Foreign Application Priority Data

Jun. 21, 1999 (JP) .......................................... 11-173903
May 23, 2000 (JP) ...................................... 2000-151438

(51) Int. Cl.[7] ................................................ G01H 3/02
(52) U.S. Cl. ....................................................... 73/37
(58) Field of Search ................................. 73/37, 38, 40

(56) References Cited

U.S. PATENT DOCUMENTS 5,889,343 A * 3/1999 Bryant et al. ................. 310/71

FOREIGN PATENT DOCUMENTS

JP         8-17542         5/1996

* cited by examiner

*Primary Examiner*—Hezron Williams
*Assistant Examiner*—Jay L. Politzer
(74) *Attorney, Agent, or Firm*—Anthony J. Casella; Gerald E. Hespos

(57) ABSTRACT

An inspection device is provided for inspecting whether the gap between the front and rear sides of a grommet is watertightly sealed. The inspection device includes a cylindrical member (10) into which electric wires (4) projected from a front end of a grommet (3) are inserted and a sealing means (11) for sealing the cylindrical member. Air is supplied into the cylindrical member (10). When the air flow stops due to pressurization of the cylindrical member (10), it is determined that the grommet (3) has passed an examination. Thus, it is possible to detect the gap between the electric wires (4) with high accuracy.

14 Claims, 17 Drawing Sheets

WATER CUT-OFF INSPECTION DEVICE FOR GROMMET

BACKGROUND OF THE INVENTION

1. Field of the Invention

The present invention relates to a water cut-off inspection device for inspecting whether a watertight seal is achieved in the gap between bundled electric wires that have been inserted into a grommet.

2. Description of the Related Art

Electric wires are bundled and passed through a through-hole formed in a partitioning wall between an engine compartment and a passenger or storage compartment of a vehicle. The bundled electric wires are used with a grommet that has a through opening and an outwardly extending flange. More particularly, the bundled electric wires are inserted through the through opening provided in the grommet and the flange is engaged with the periphery of the through-hole in the partitioning wall. A resinous material is filled into the gap between the electric wires accommodated in the grommet to achieve a watertight seal of the gap between the electric wires. The prior art has not included means for inspecting whether the gap between the electric wires has achieved a sufficiently watertight seal.

The present invention has been made in view of the above-described situation. Thus, it is an object of the present invention to provide an inspection device for inspecting whether the gap between the front side of a grommet and the rear side thereof has achieved a watertight seal.

SUMMARY OF THE INVENTION

The present invention is directed to an inspection device for inspecting whether the gap between bundled electric wires that have been inserted into a grommet has a watertight seal. The inspection device includes a cylindrical member, and the electric wires that project from a front end of the grommet are inserted into the cylindrical member. The inspection device also includes a sealing means for sealing the cylindrical member. A supply of air then is supplied into the cylindrical member, and a test is performed to determine whether a flow of the pressurized air exists across the grommet. When air supplied into the cylindrical member stops due to pressurization, it is determined that the grommet has passed an examination.

The inspection device utilizes the fact that when an air pressure inside the cylindrical member reaches a steady state, additional air does not flow into the cylindrical member if a gap between the electric wires is sealed securely. On the other hand, air continues to flow into the cylindrical member if there is a gap between the electric wires.

Preferably, the sealing means of the cylindrical member includes a cover that has an electric wire insertion hole and a grommet-holding frame that can be fitted on the front end of the grommet. The grommet-holding frame is brought close to the cylindrical member with a catching fitting to press a surface of the front end of the grommet against the cover. The interior of the cylindrical member can be accessed by opening the cover. Electric wires then can be inserted easily into the cylindrical member, with connectors mounted on the electric wires. Thus, the grommet-holding frame can be installed on the cylindrical member with the cover closed, and it is possible to prevent leakage of the air inside the cylindrical member.

Preferably, the cover is composed of two parts; and the electric wire insertion hole straddles the two parts. In this construction, the electric wire insertion hole is open, and hence the electric wires and the connectors provided thereon can be inserted easily into the insertion hole.

A packing preferably is formed on a periphery of an open portion of the cylindrical member. It is also preferable to form a groove on the cover into which the packing can be fitted. This construction improves the sealing performance of the cylindrical member.

An elastic member preferably is interposed between the grommet-holding frame and the cover. Thus, it is possible to facilitate a removing operation.

The grommet-holding frame preferably has a press rib fitted in an annular groove formed on a periphery of the front end of the grommet to sandwich a front edge portion of the grommet formed forward from the annular groove between the cover and the press rib. In this case, it is possible to seal the grommet during an inspecting operation by reliably sandwiching the front edge portion between the press rib and the cover.

Preferably, the grommet-holding frame is connected removably to the cylindrical member as a unit. In this case, the installation and removal of the sealing means can be accomplished easily during the installation of the grommet on the cylindrical member even if the wires that project from the grommet are connected with connectors.

In another aspect of the present invention, there is provided a holder for holding the unit of the grommet-holding frame and the cover temporarily. Thus, the grommet is installed on the grommet-holding frame that is accommodated in an accommodation portion. The unit can be installed on and removed from the holder and the grommet is removed from the grommet-holding frame. In this case, it is very easy to install the grommet on the cylindrical member.

DETAILED DESCRIPTION OF THE PREFERRED EMBODIMENTS

Figure 1:
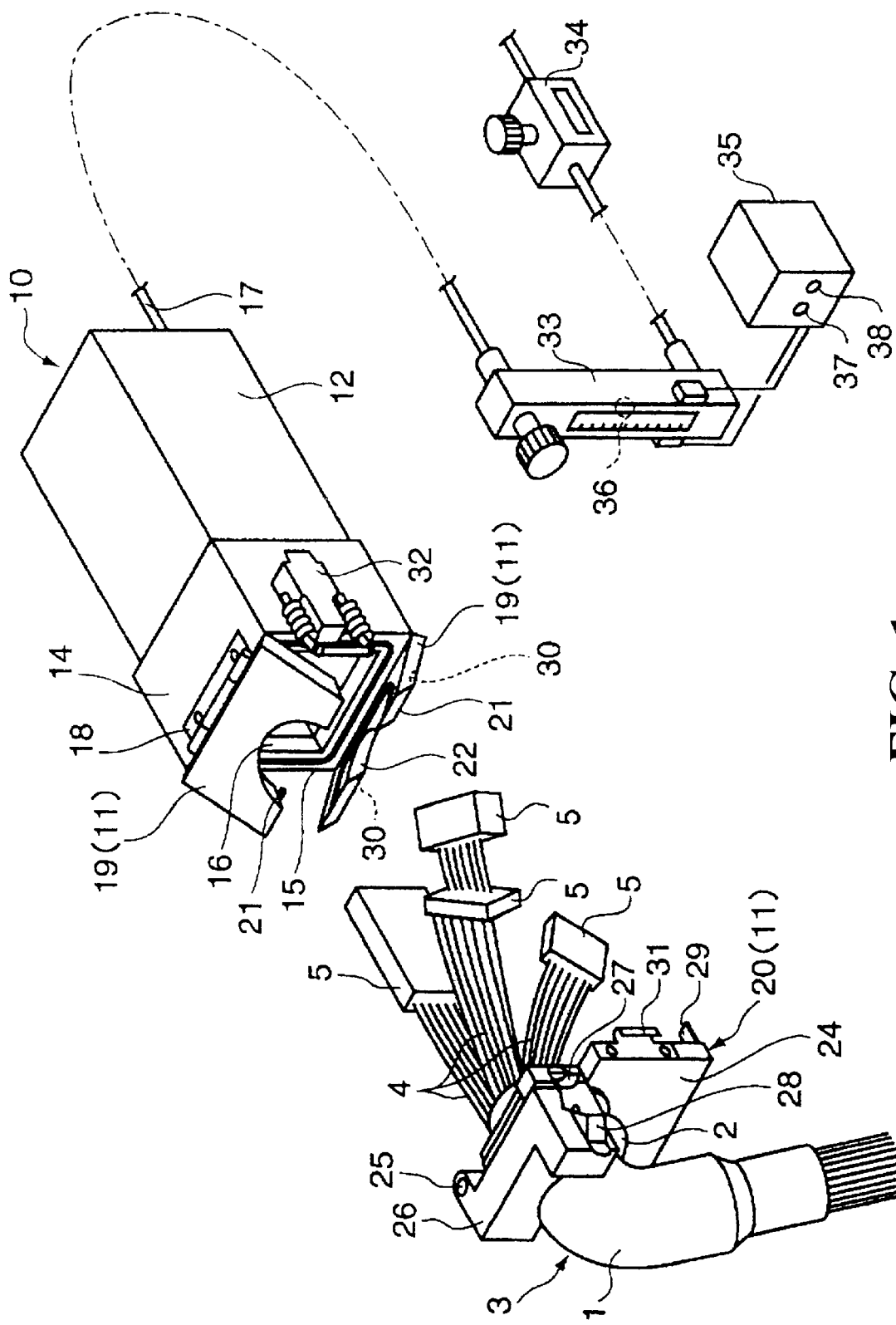
FIG. 1 is an exploded perspective view showing an inspection device of a first embodiment of the present invention.
Figure 2:
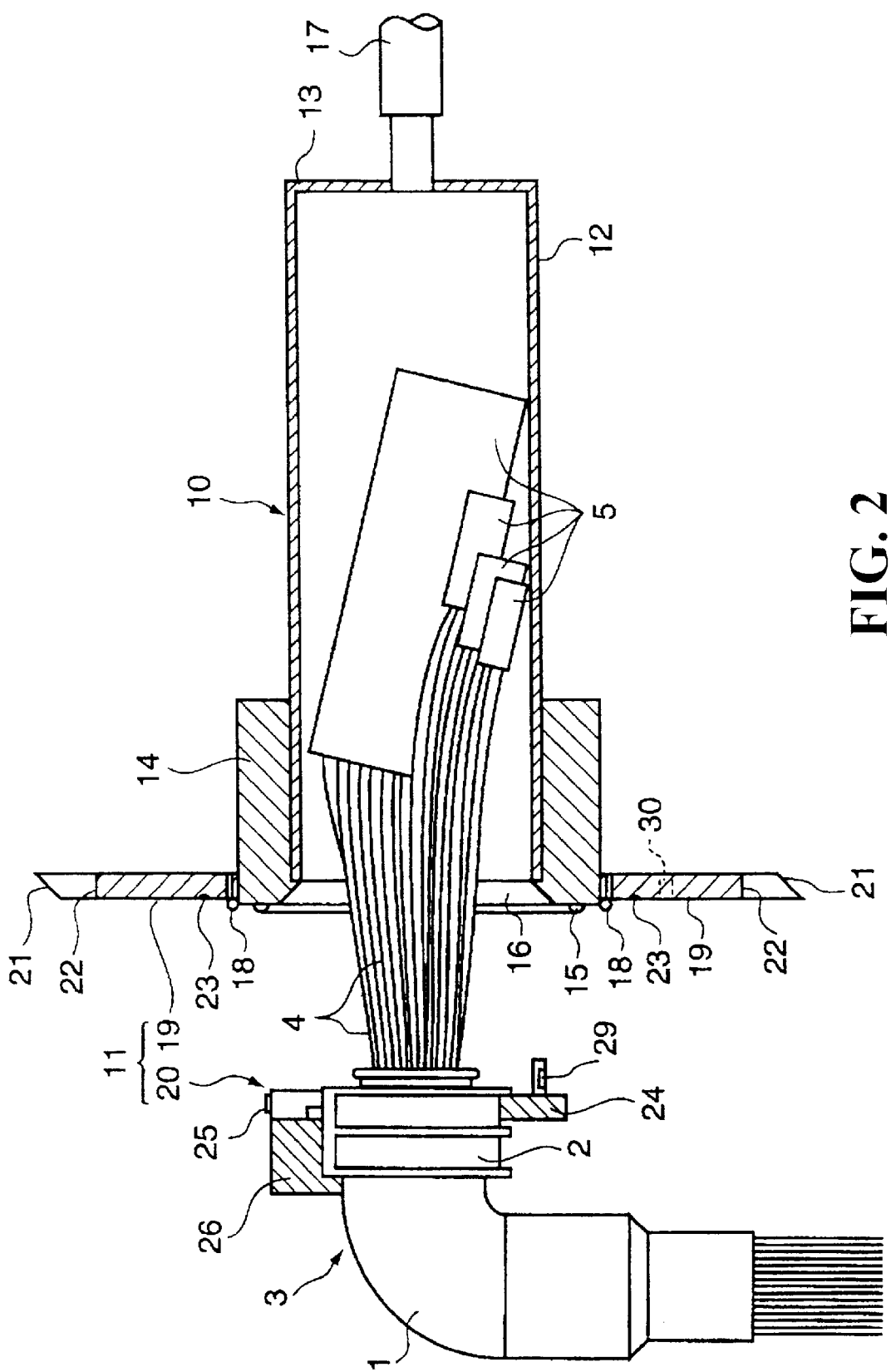
FIG. 2 is a longitudinal side view showing a state in which a cover of the inspection device is opened.
Figure 3:
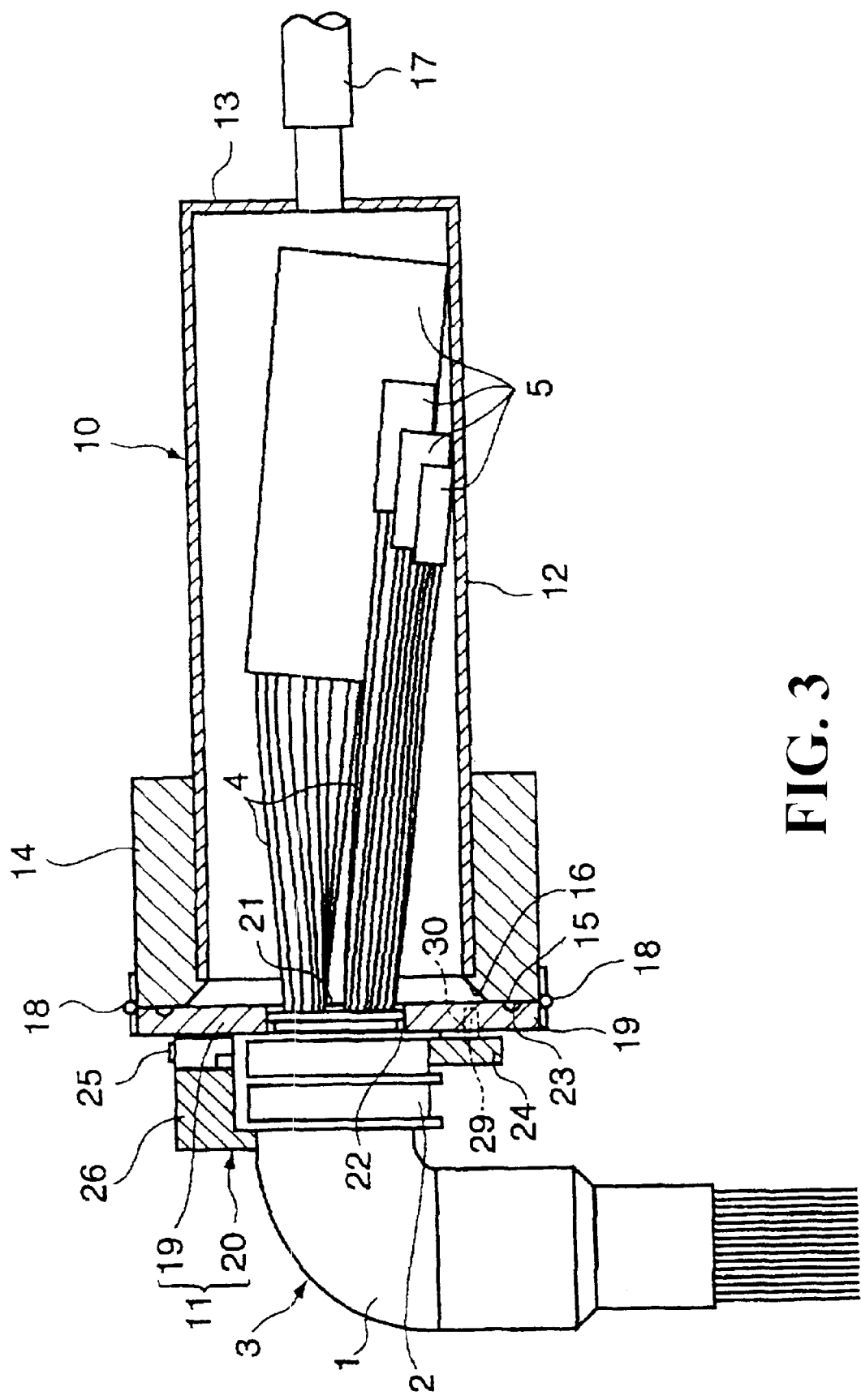
FIG. 3 is a longitudinal side view showing a state in which a grommet-holding frame of the inspection device is set.
Figure 6:
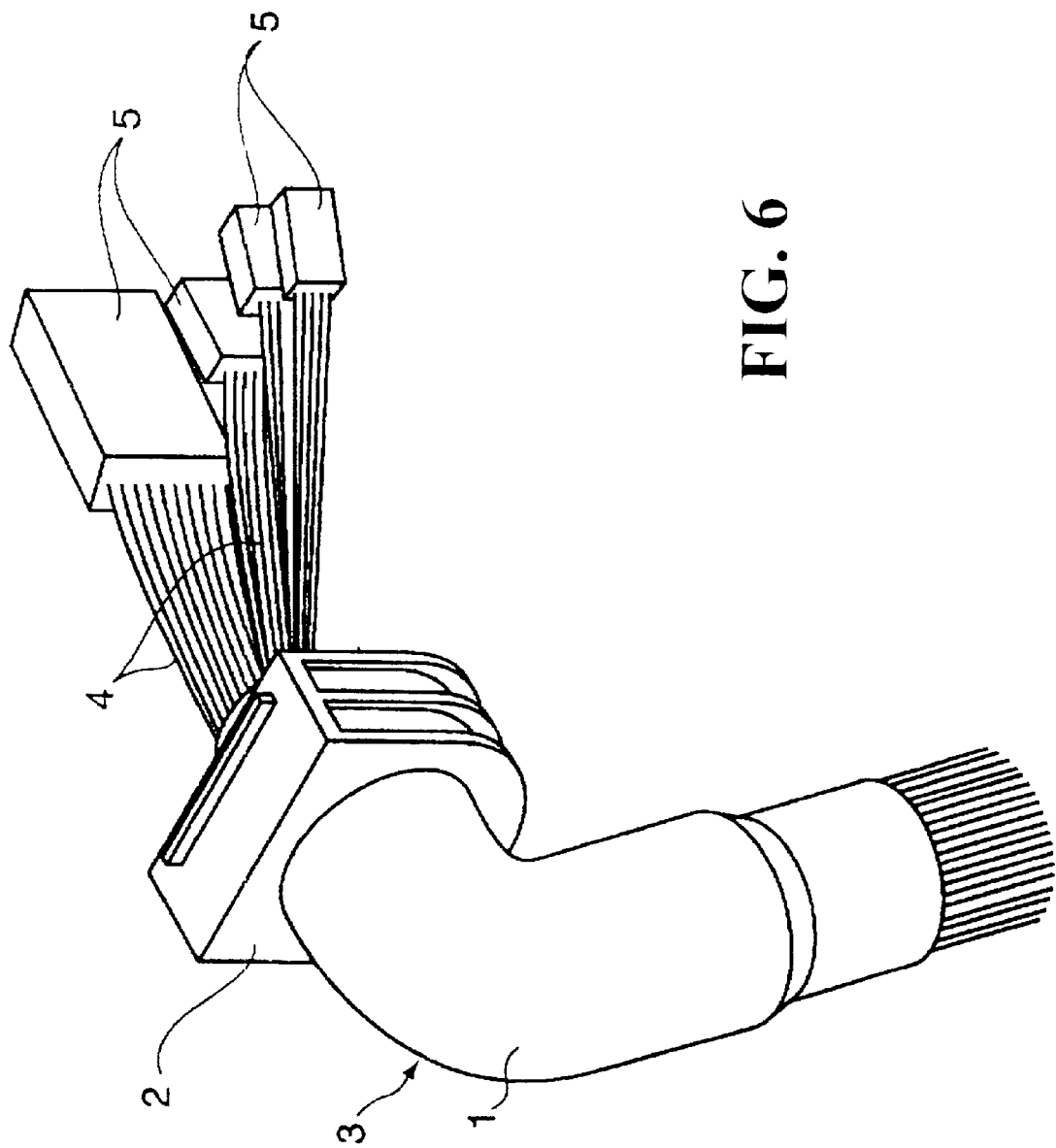
FIG. 6 is a perspective view showing a grommet to be inspected.

An inspection device according to the subject invention is illustrated in FIGS. 1–3. The inspection device is used to inspect an object, such as the object shown in FIG. 6. In the embodiment shown in FIG. 6, an object to be examined includes a grommet 3 having an elbow-shaped rubber tube 1 and a flange 2 on a front end of the rubber tube 1. The object further includes a bundle of electric wires 4 that are inserted through the grommet 3 and connectors 5 mounted on respective front ends of the electric wires 4.

As shown in FIGS. 1 through 3, the inspection device according to the present invention has a cylindrical member 10 and a sealing means 11 for sealing the cylindrical member 10. The electric wires 4 that project from the front end of the grommet 3 are inserted into the cylindrical member 10 and are sealed by the sealing means 11, as explained herein.

The cylindrical member 10 includes a rectangular solid container 12 having a rear wall 13 formed thereon and an opposed front portion. A frame 14 is installed on the periphery of the front portion of the rectangular solid container 12. A packing 15 is mounted on the periphery of an open portion of the front frame 14, and a tapered portion 16 is formed by a chamfer on the edge of the open portion of the front frame 14. A hose 17 is connected to the rear wall 13, and is operative for injecting air into the cylindrical member 10.

The sealing means 11 has a pair of covers 19 connected to the front frame 14 through a hinge 18. The sealing means 11 further has a grommet-holding frame 20 that can be fitted on the front end of the grommet 3. An inclined surface 21 is formed on a front end of each cover 19, and the inclined surfaces 21 of the covers 19 are butted against each other when the covers 19 are closed. An electric wire insertion hole 22 is formed on each cover 19 at a butting position thereof. A groove 23 is formed on a rear surface of each cover 19. The grooves 23 are dimensioned and disposed to accommodate the packing 15 when the covers 19 are closed.

The grommet-holding frame 20 includes a frame plate 24, and the flange 2 of the grommet 3 is inserted into the frame plate 24 from above. A pin 25 projects upwardly from the frame plate 24, and a pressing rod 26 is installed rotatably on the pin 25. A hook 27 is installed on an upper portion of one side of the frame plate 24, and a catching clip 28 is installed at a front end of the pressing rod 26. The grommet 3 is held on the frame plate 24 by hooking the catching clip 28 to the hook 27. At this time, the flange 2 of the grommet 3 engages the frame plate 24 and the pressing rod 26, thus preventing the grommet 3 from slipping rearwardly off the grommet-holding frame 20.

Two guide rods 29 project forward from a front surface of the frame plate 24, and guide holes 30 are formed at the respective sides of one of the covers 19. When the covers 19 are closed, the guide rods 29 are inserted into the respective guide holes 30 to guide the grommet-holding frame 20 to a predetermined position. A hook 31 is mounted on each side surface of the frame plate 24, and spring-attached catching clips 32 are formed on the corresponding outer side surfaces of the front frame 14. The grommet-holding frame 20 is installed on the cylindrical member 10 by hooking the catching clips 32 to the hooks 31.

The hose 17 is connected to a regulator 34 for adjusting the pressure of air supplied to the cylindrical member 10. The air is delivered from a pressure source and through a flow meter 33 that is connected electrically to a success/failure determining box 35. A float 36 of the flow meter 33 goes up and down, depending on a flow rate of the air. When the float 36 is at a lowermost position, a success lamp 37 of the success/failure determining box 35 is turned on. When the float 36 is not at the lowermost position, a failure lamp 38 of the success/failure determining box 35 is turned on.

The inspection device is used to check whether a gap exists between electric wires 4 of the grommet 3. More particularly, the grommet-holding frame 20 is fitted on the front end of the grommet 3. The cover 19 of the cylindrical member 10 then is open, and the electric wires 4 that project from the front end of the grommet 3 are inserted into the cylindrical member 10. The electric wires 4 with the connectors 5 mounted thereon can be inserted easily into the cylindrical member 10 because the cover 19 of the cylindrical member 10 is open.

Then, as shown in FIG. 3, the cover 19 is closed with the bundles of the electric wires 4 passed through the electric wire insertion hole 22, and the grommet-holding frame 20 is installed on the cylindrical member 10. At this time, the catching clip 32 is hooked to the hook 31 shown in FIG. 1 to bring the grommet-holding frame 20 close to the cylindrical member 10. As a result, as shown in FIG. 3, the front end surface of the grommet 3 is pressed against the cover 19 and the packing 15 that had been fitted in the groove 23 is compressed. Thus, the cylindrical member 10 can be sealed reliably.

With the grommet 3 set in the manner as described above, air is supplied into the cylindrical member 10 through the hose 17, and the flow rate is measured by the flow meter 33. When the gaps between the electric wires 4 have been sealed, the air inside the cylindrical member 10 is pressurized, and the air pressure reaches a steady state. Consequently, air does not flow into the cylindrical member 10. Thus, the flow meter 33 indicates zero, and the success lamp 37 of the success/failure determining box 35 is turned on. On the other hand, if there is a gap between the electric wires 4, air continues to flow into the cylindrical member 10. Therefore, the failure lamp 38 remains turned on.

As described above, the inspection device prevents leakage of air from a sealing portion of the cylindrical member 10. Thus, it is possible to detect the gap between the electric wires 4 with high accuracy and to check whether the space between the front side of the grommet 3 and the rear side thereof can achieve an effective watertight seal.

Figure 4:
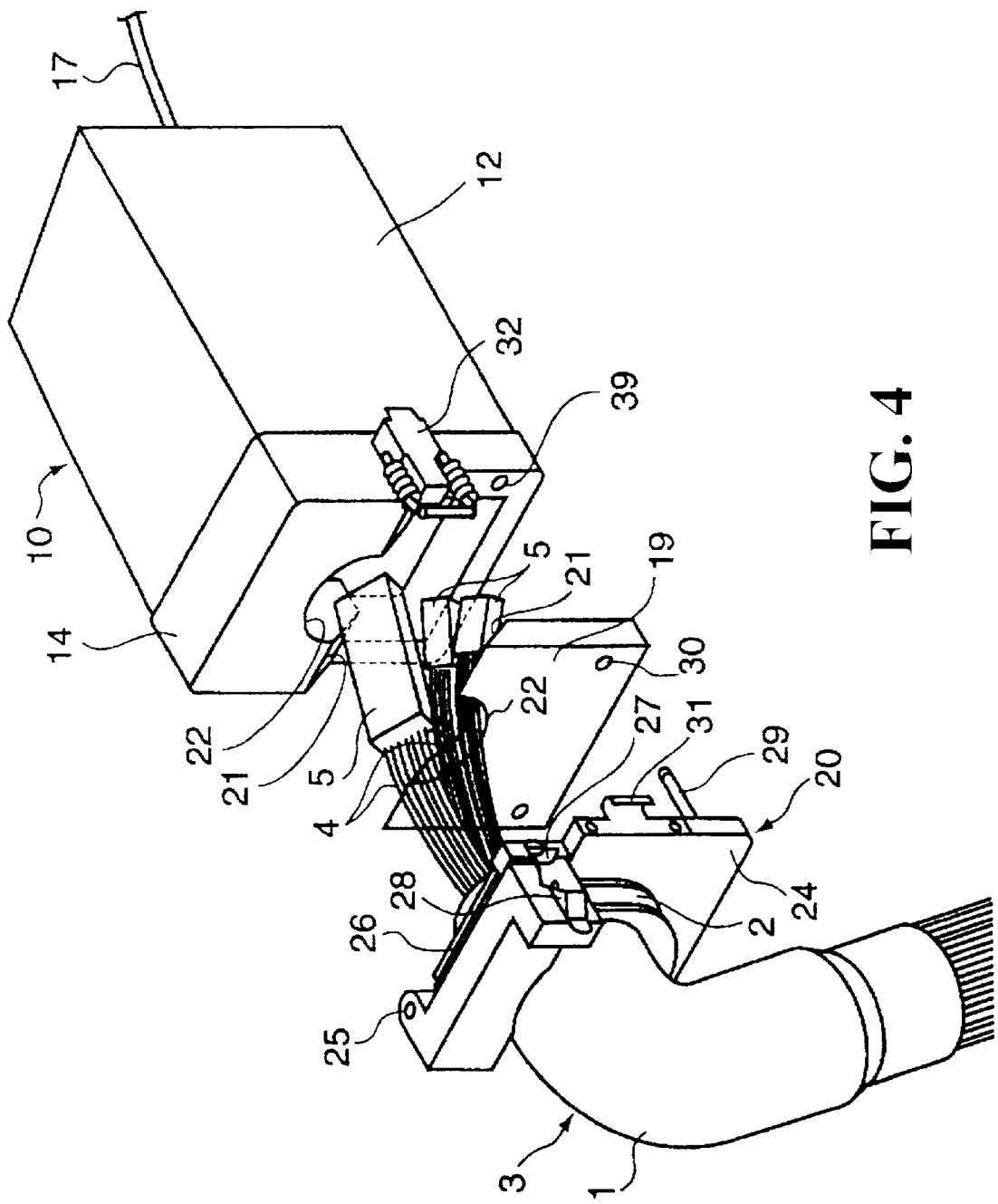
FIG. 4 is an exploded perspective view showing an inspection device of a second embodiment of the present invention.

As shown in FIG. 4, the front frame 14 is provided with only one cover 19 made of hard rubber to open half of the front frame 14 of the cylindrical member 10. In this case, a guide rod 29 is inserted through a guide hole 30 in the cover 19 and into an insertion hole 39 formed on the front frame 14. Thus, the cover 19 is supported on the guide rod 29 and is sandwiched between the front frame 14 and the frame plate 24.

Figure 5:
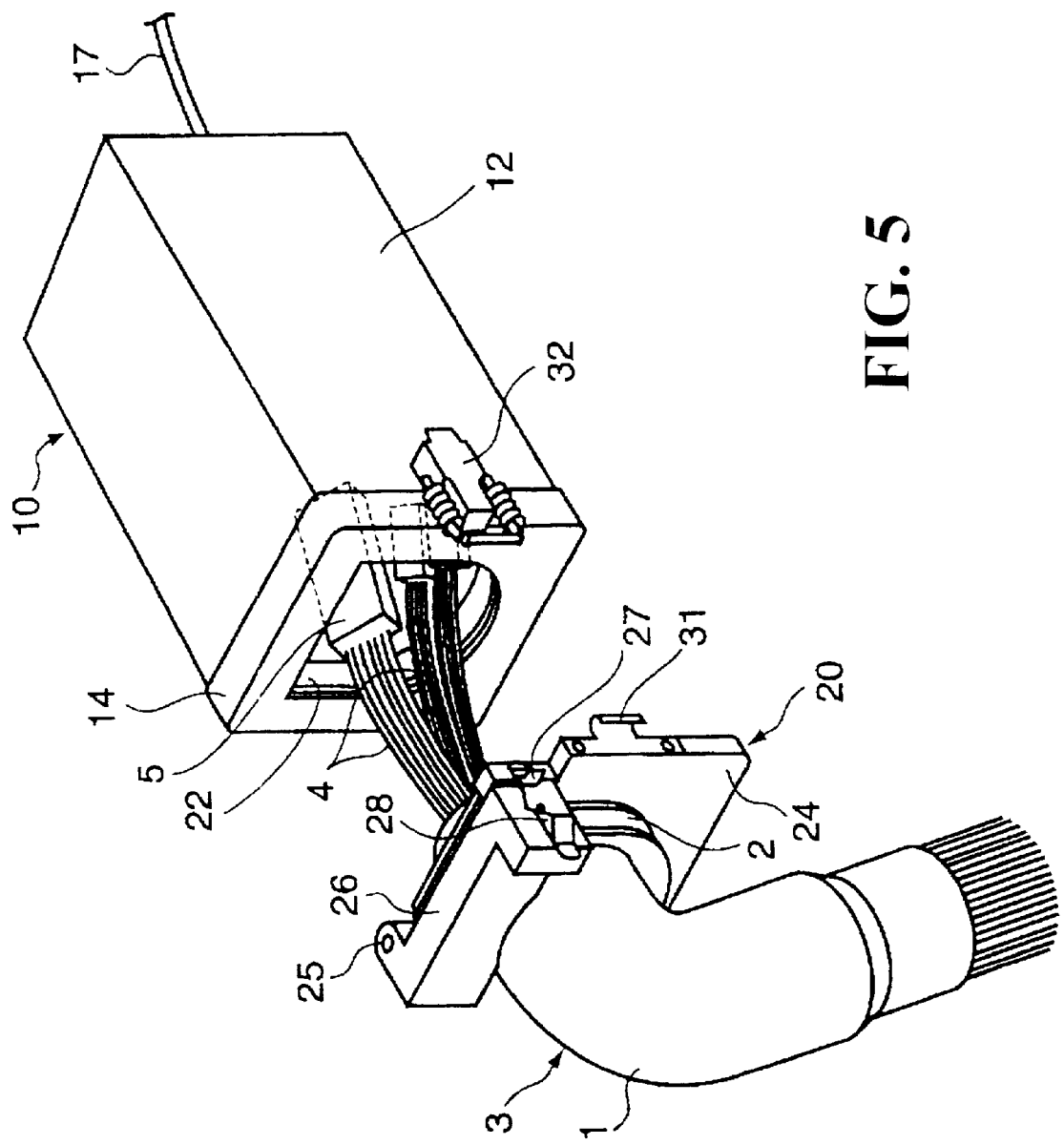
FIG. 5 is an exploded perspective view showing an inspection device of a third embodiment of the present invention.

As shown in FIG. 5, the front frame 14 does not have a cover 19 and the grommet-holding frame 20 is mounted on the front frame 14 directly. In this case, the electric wire insertion hole 22 is formed on the front frame 14, and the flange 2 of the grommet 3 is fitted on the periphery of the electric wire insertion hole 22.

Figure 7:
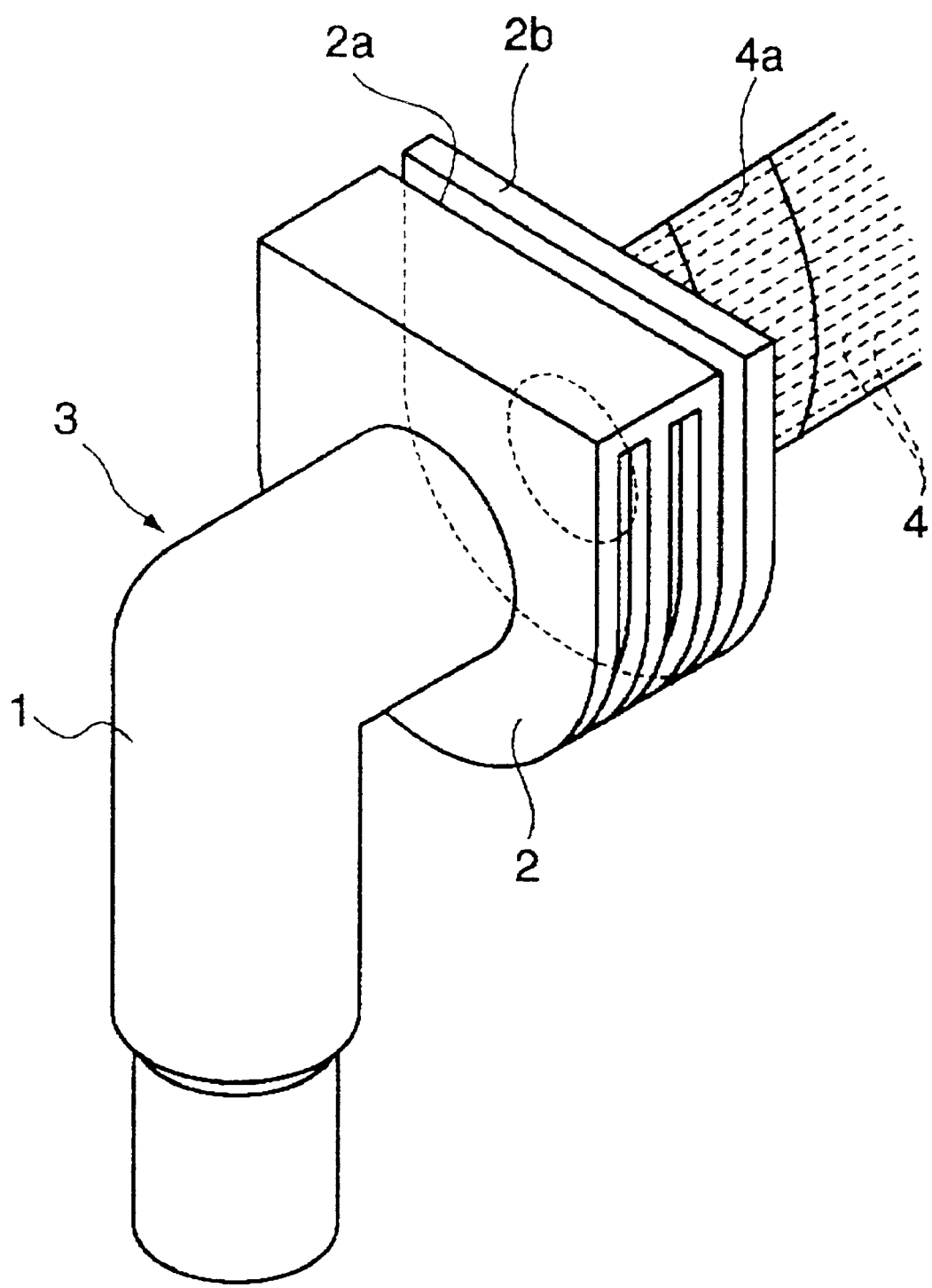
FIG. 7 is a perspective view showing another grommet to which the present invention is applicable.

FIG. 7 is a perspective view showing another grommet 3 to which the present invention is applicable. The grommet 3 shown in FIG. 7 has an annular groove 2a separating a flange 2 into a front edge portion 2b and a rear portion. The groove 2a allows the front edge portion 2b to be highly flexible. The embodiment of the invention shown in FIGS. 8–17 is provided to inspect the grommet 3 having the construction shown in FIG. 7. Electric wires 4 shown in FIG. 7 are bundled with a tape 4a.

Figure 8:
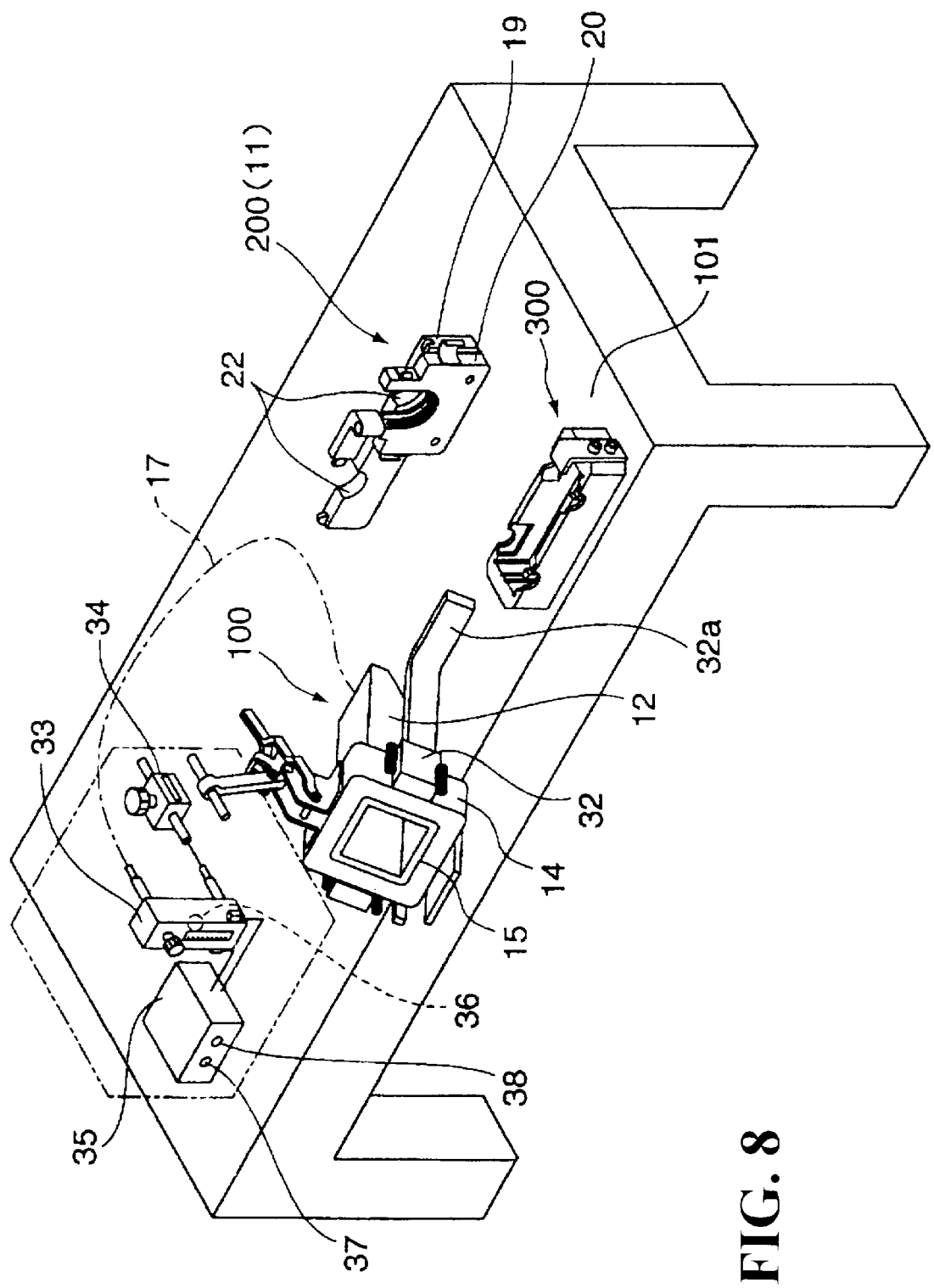
FIG. 8 is a perspective view showing the entire construction of still another embodiment of the present invention.

The embodiment shown in FIG. 8 includes a work bench (placing table) 101. A cylindrical member 100, a unit 200 constituting a sealing means 11, and a holder 300 for temporarily holding the unit 200 all are mounted on the work bench 101.

Figure 9:
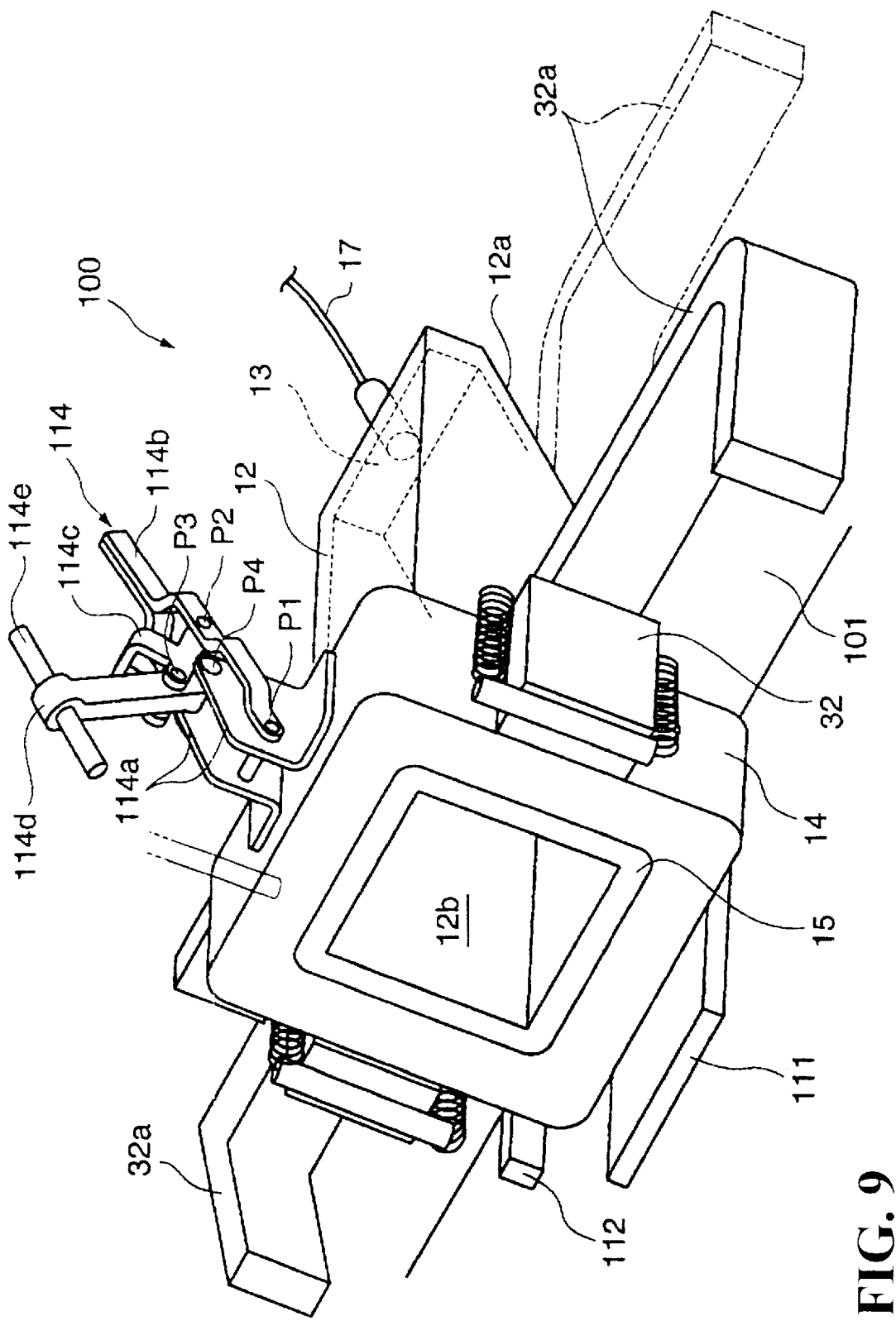
FIG. 9 is a perspective view showing a cylindrical member of the embodiment shown in FIG. 8.

Referring to FIG. 9, the cylindrical member 100 is set on the work bench 101. The cylindrical member 100 includes a rectangular solid container 12 with a chamfered bottom portion 12a and an open portion 12b. The open portion 12b faces obliquely and upwardly by placing the chamfered bottom portion 12a of the rectangular solid container 12 on the upper surface of the work bench 101 (see FIG. 8).

Positioning plates 111, 112 are installed on the bottom and one side surface of the front frame 14 of the cylindrical member 100 to position the unit 200, which will be described later, on the front surface of the front frame 14. A toggle clamp 114 is fixed on the upper surface of the front frame 14 for clamping the unit 200 between the toggle clamp 114 and the positioning plate 111 that is installed on the bottom of the front frame 14.

The toggle clamp 114 has a pair of stays 114a. A lever 114b is supported by each stay 114a, and a connection member 114c is installed on the lever 114b. The toggle clamp 114 further includes a rotary arm 114d which is rotated by operating the lever 114b through the connection member 114c, and a pressing knob 114e that is fixed to a free end of the rotary arm 114d. The stay 114a, the lever 114b, the connection member 114c, the pressing knob 114e, and rotation shafts P1–P4 of these members constitute a toggle unit that is displaceable between a release posture (see FIG. 16) for releasing the unit 200 between the pressing knob 114e and the positioning plate 111 and a clamping posture (see FIG. 17) for clamping the unit 200. In the embodiment shown in FIG. 8, the toggle clamp 114 has an L-shaped lever 32a mounted at each side surface to operate catching clips 32 installed on each of the side surfaces of the front frame 14.

Figure 10:
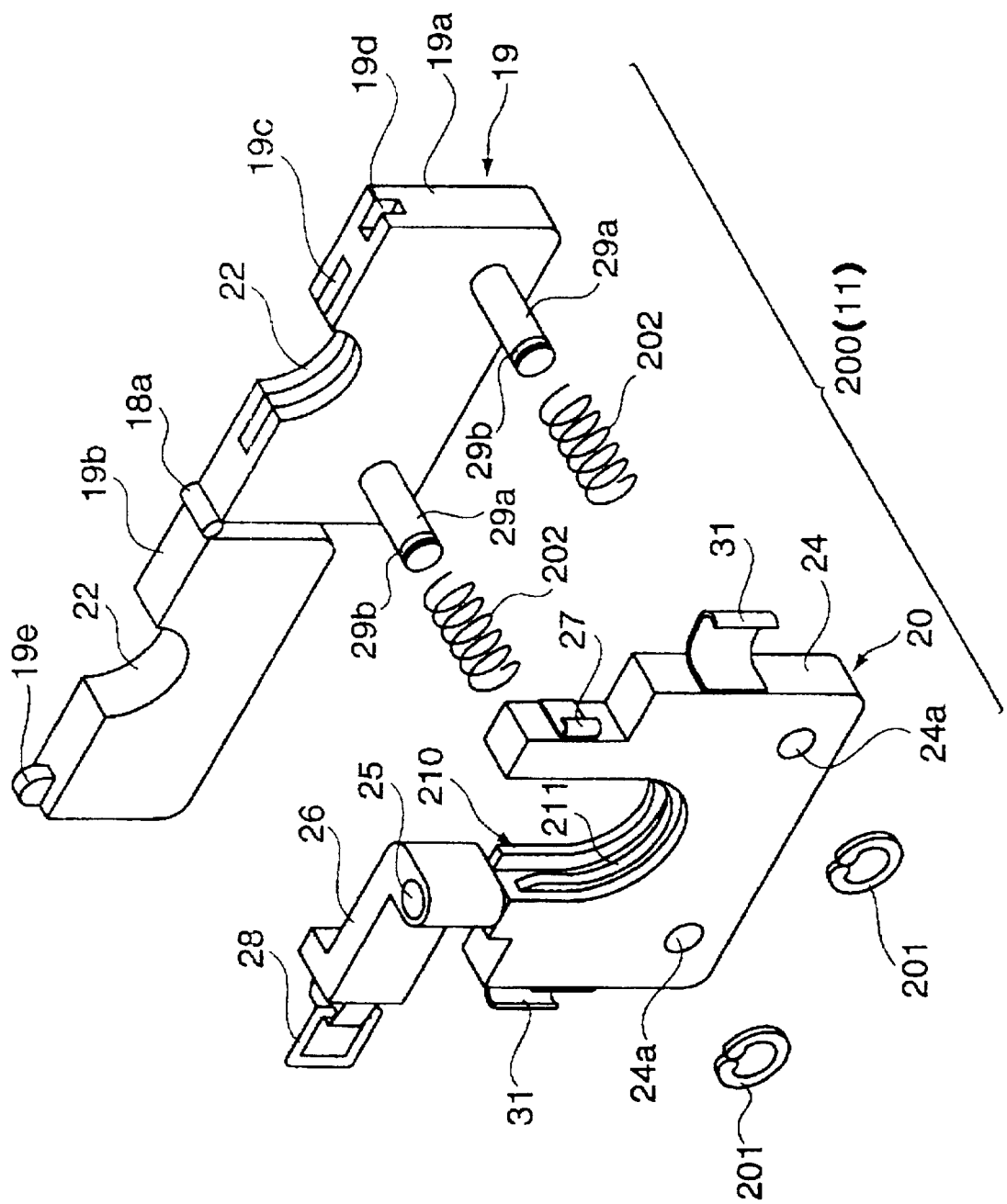
FIG. 10 is an exploded perspective view showing a sealing means of the embodiment shown in FIG. 8.

Referring to FIG. 10, the unit 200 of the embodiment shown in FIG. 8 is removably installed on the cylindrical member 100 by connecting a grommet-holding frame 20 to connection pins 29a that project from a cover 19. The cover 19 has two half parts connected to each other with a hinge 18a so that the cover 19 can be opened.

The base portion of each connection pin 29a of the unit 200 is cantilevered from the cover 19. A peripheral groove 29b is formed at a free end of each connection pin 29a, and is configured for locked engagement with a C-ring 201. The lower portion of the cover 19 and the grommet-holding frame 20 are connected to each other by inserting the connection pins 29a into an insertion holes 24a formed on the grommet-holding frame 20 and locking the C-rings 201 to the peripheral grooves 29b. Thus, the grommet-holding frame 20 is displaceable in the longitudinal direction of the connection pins 29a. In the embodiment shown in FIG. 8, a coil spring 202 is disposed on the periphery of each connection pin 29a and is interposed between the cover 19 and the grommet-holding frame 20. The coil springs 202 urge the cover 19 and the grommet-holding frame 20 away from one another. Thus, it is possible to prevent the inspected grommet 3 from contacting the cover 19 or the grommet-holding frame 20 and to facilitate removal.

In the construction shown in FIG. 10, the cover 19 comprises a lower part 19a that is connected to an upper part 19b with a hinge 18a that is formed on one side of each of the lower part 19a and the upper part 19b. A sealing member 19c is formed on a connection portion of the lower part 19a to obtain a high degree of air tightness. A notch 19d is formed on the lower member 19a at the side opposite the hinge 18a and a projection 19e is formed on the upper member 19b at a portion corresponding to the notch 19d. The projection 19e is fitted in the notch 19d when the lower part 19a and the upper part 19b are closed.

The grommet-holding frame 20 is formed with a semi-circular press rib 210 than can be fit in the groove 2a of the grommet 3 (see FIG. 7) when the grommet-holding frame 20 is installed on the grommet 3. In a sealed state, the front edge portion 2b of the grommet 3 is sandwiched between the press rib 210 and the cover 19 under pressure to keep a high degree of air tightness. In the embodiment shown in FIG. 8, a semicircular rib 211 having a configuration corresponding to the outer configuration of the flange 2 is formed rearward from the press rib 210 to prevent the grommet 3 from slipping rearwardly off the grommet-holding frame 20, when the grommet-holding frame 20 is installed on the grommet 3.

Figure 11:
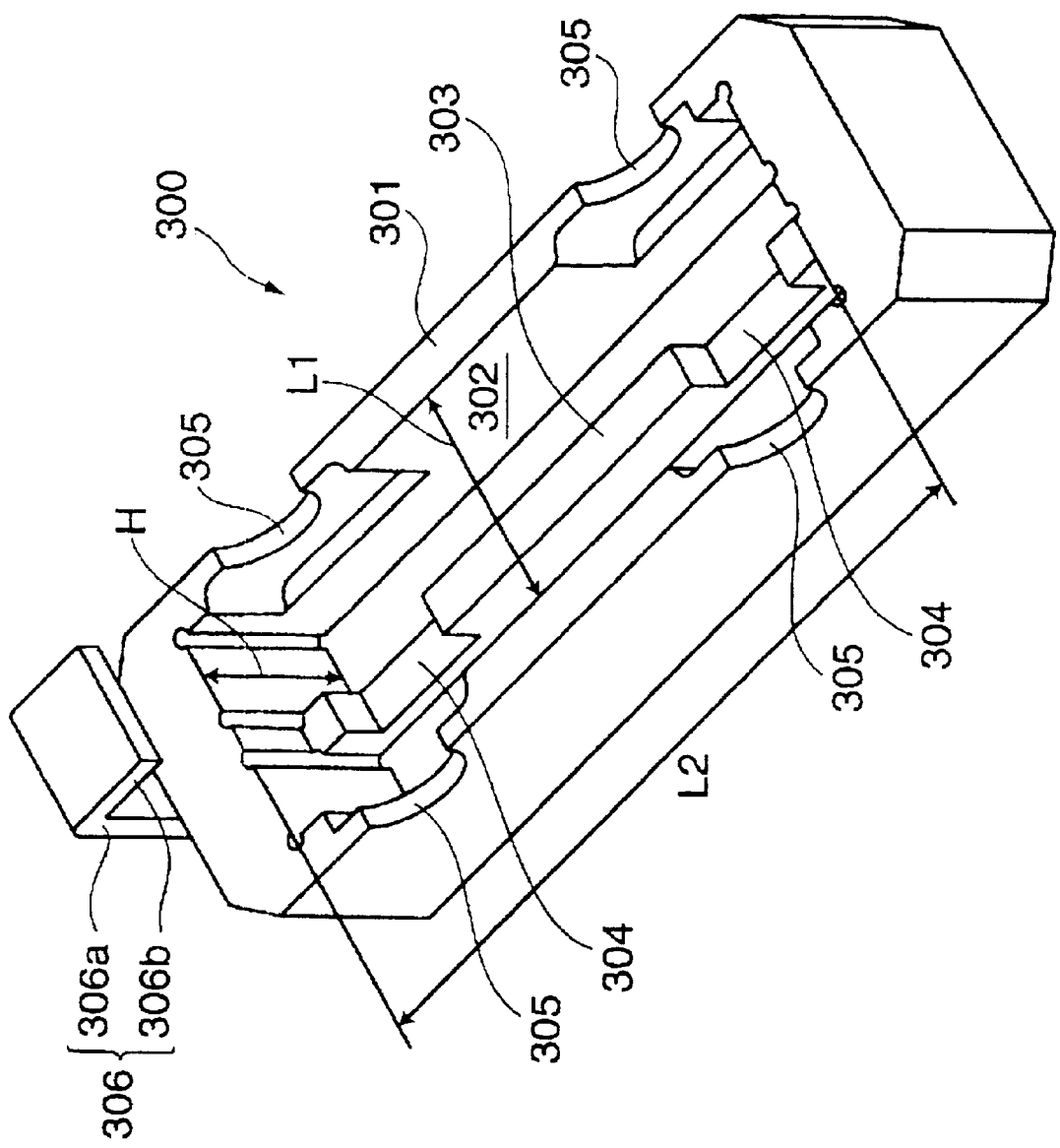
FIG. 11 is a perspective view showing a holder, for temporarily holding a unit, of the embodiment shown in FIG. 8.

FIG. 11 is a perspective view showing the holder 300, for temporarily holding the unit 200, according to the embodiment shown in FIG. 8.

Referring to FIG. 11, the holder 300 holds the unit 200 temporarily and is used to install and remove the grommet 3. The holder 300 has an approximately rectangular body 301 that is formed by molding resin. The body 301 has an accommodation concave portion 302 on its upper surface. The accommodation concave portion 302 has a width L1 and a depth H only just large enough to accommodate the lower portion of the unit 200. The accommodation concave portion 302 has a length L2 a little longer than the width of the unit 200. Thus, the accommodation concave portion 302 can accommodate the unit 200 such that the unit 200 is capable of moving longitudinally.

A rib 303 is formed on the bottom of the accommodation concave portion 302 for partitioning the unit 200 and the grommet-holding frame 20. Referring to FIG. 11, notches 304 are formed at predetermined positions on the rib 303 to prevent the connection pin 29a of the unit 200 and the coil spring 202 from interfering with each other. Semicircular concave portions 305 are formed on both side walls of the body 301 at locations substantially aligned with the respective notches 304. The semicircular concave portions 305 are provided for releasing the connection pin 29a of the unit 200 accommodated in the accommodation concave portion 302.

The right and left sides of each of the notch 304 and the concave portion 305 are symmetrical with respect to the center of the body 301. The thickness of the cover 19 is almost the same as that of the grommet-holding frame 20. Therefore, the unit 200 can be installed on the accommodation concave portion 302 even if the rear side thereof is turned forward.

A locking metal fitting 306 is fixed to one widthwise surface of the body 301. The locking metal fitting 306 has a vertical portion 306a projecting upward above the body 301 and a bent portion 306b integral with the vertical portion 306a and extending horizontally from the top of the vertical portion 306a toward the accommodation concave portion 302. The bent portion 306b of the locking metal fitting 306 allows insertion and removal of the unit 200 at the side (hereinafter referred to as installing/removing side) of the accommodating concave portion 302 opposite to the position of the locking metal fitting 306. The unit 200 accommodated in the accommodation concave portion 302 then is moved to the side (hereinafter referred to as metal fitting side) of the bent portion 306b to allow the bent portion 306b to be positioned above the hook 31 of the grommet-holding frame 20, thus preventing the unit 200 from slipping off upward.

FIGS. 12 through 17 are perspective views showing the procedure of inspecting the grommet according to the embodiment shown in FIG. 8.

Figure 12:
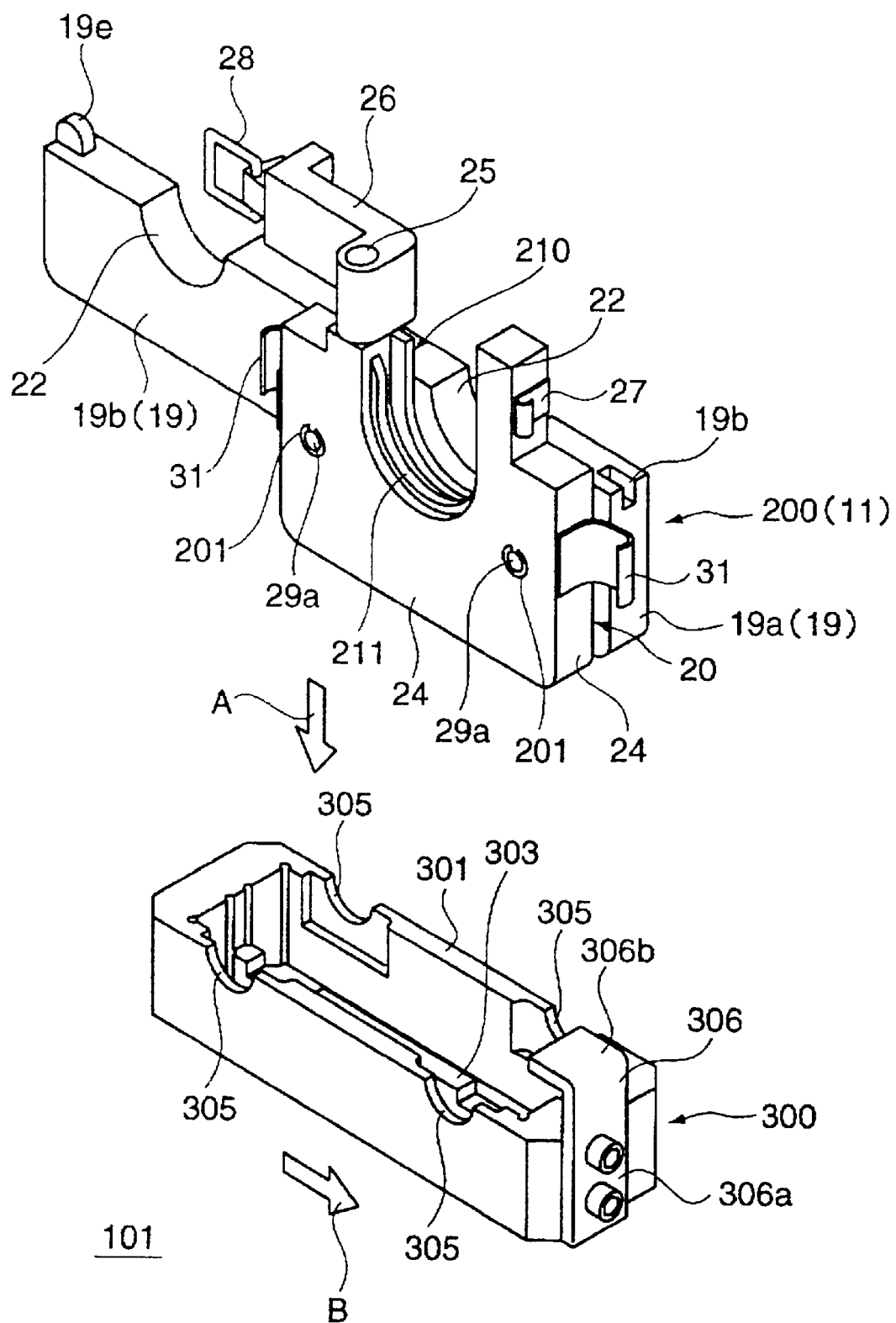
FIG. 12 is a perspective view showing the procedure of inspecting a grommet of the embodiment shown in FIG. 8.

Referring to FIG. 12, the unit 200 is held temporarily on the holder 300 that is fixed to the work bench 101 in FIG. 8. As shown with arrows A, B in FIG. 12, the unit 200 is introduced into the accommodation concave portion 302 from the installing/removing side of the accommodation concave portion 302 and is brought close to the metal fitting side to allow the hook 31 to be positioned below the bent portion 306b of the locking metal fitting 306. In this manner, the unit 200 is held temporarily to prevent the unit 200 from slipping off upward.

Figure 13:
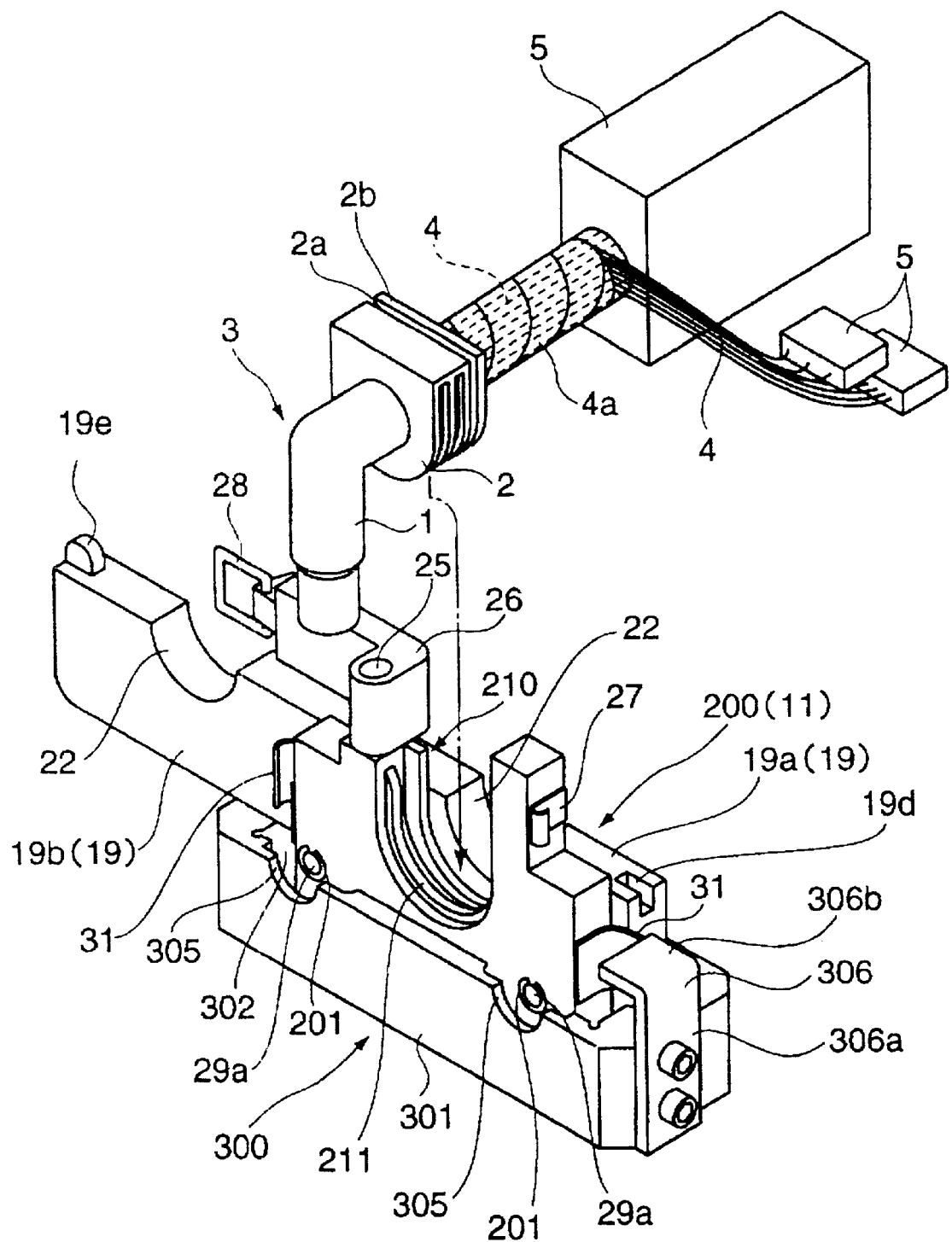
FIG. 13 is a perspective view showing the procedure of inspecting a grommet of the embodiment shown in FIG. 8.

Then as shown in FIG. 13, the flange 2 of the grommet 3 connected to the connector-attached electric wires 4 is installed on the grommet-holding frame 20 of the unit 200 that has been held temporarily by the holder 300. At this time, the press rib 210 of the grommet-holding frame 20 is fitted in the peripheral groove 2a formed on the flange 2 of the grommet 3.

Figure 14:
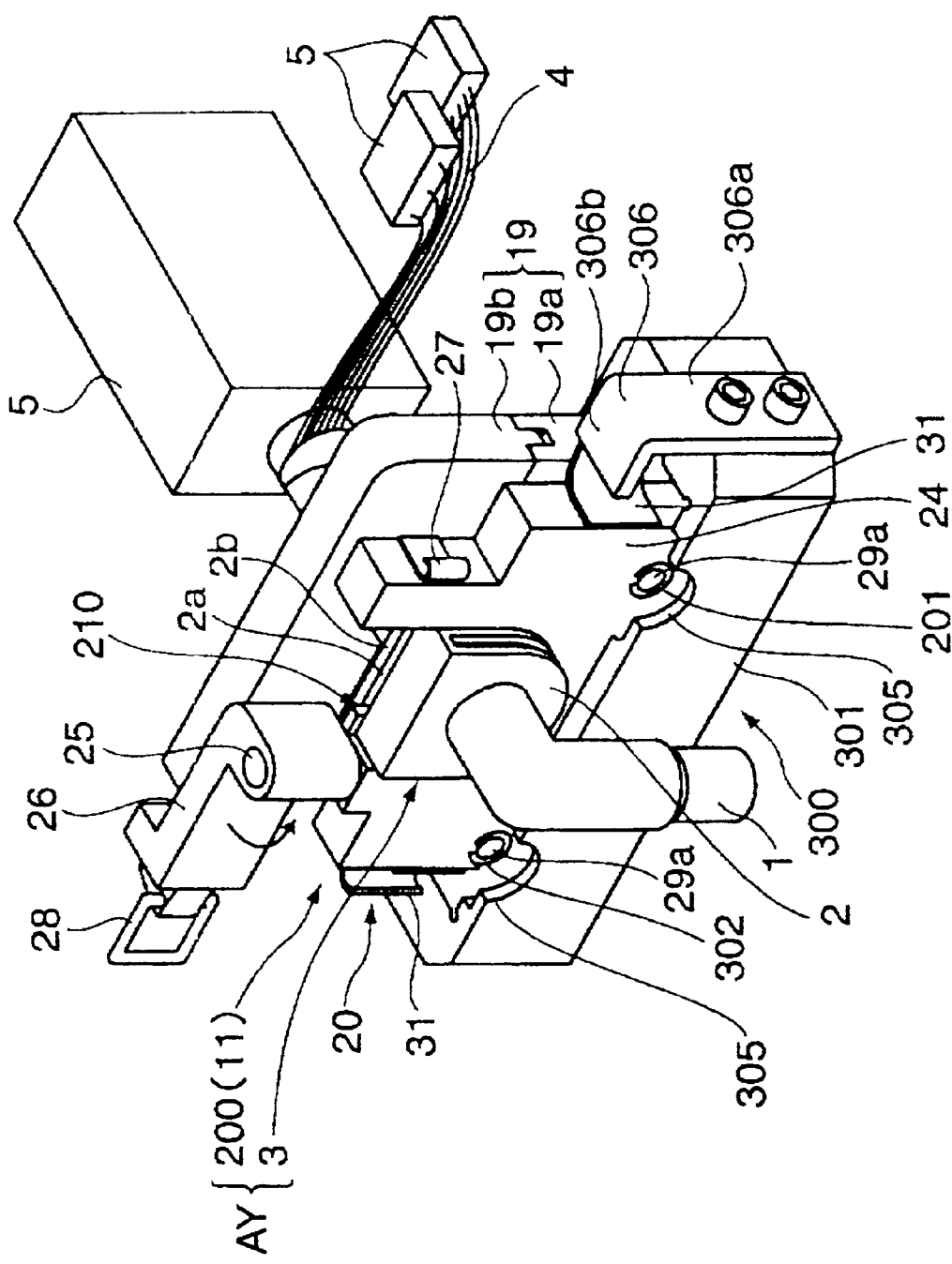
FIG. 14 is a perspective view showing the procedure of inspecting a grommet of the embodiment shown in FIG. 8.

Referring to FIG. 14, after the grommet 3 is installed on the grommet-holding frame 20, the upper part 19b of the cover 19 is rotated to surround the electric wires 4. Then, the pressing rod 26 is rotated around the pin 25 to lock the catching clip 28 to the hook 27. Thus, the grommet-holding frame 20 is locked to the grommet 3.

The unit 200, the cover 19, and the grommet-holding frame 20 are held together as an assembled unit AY.

Figure 15:
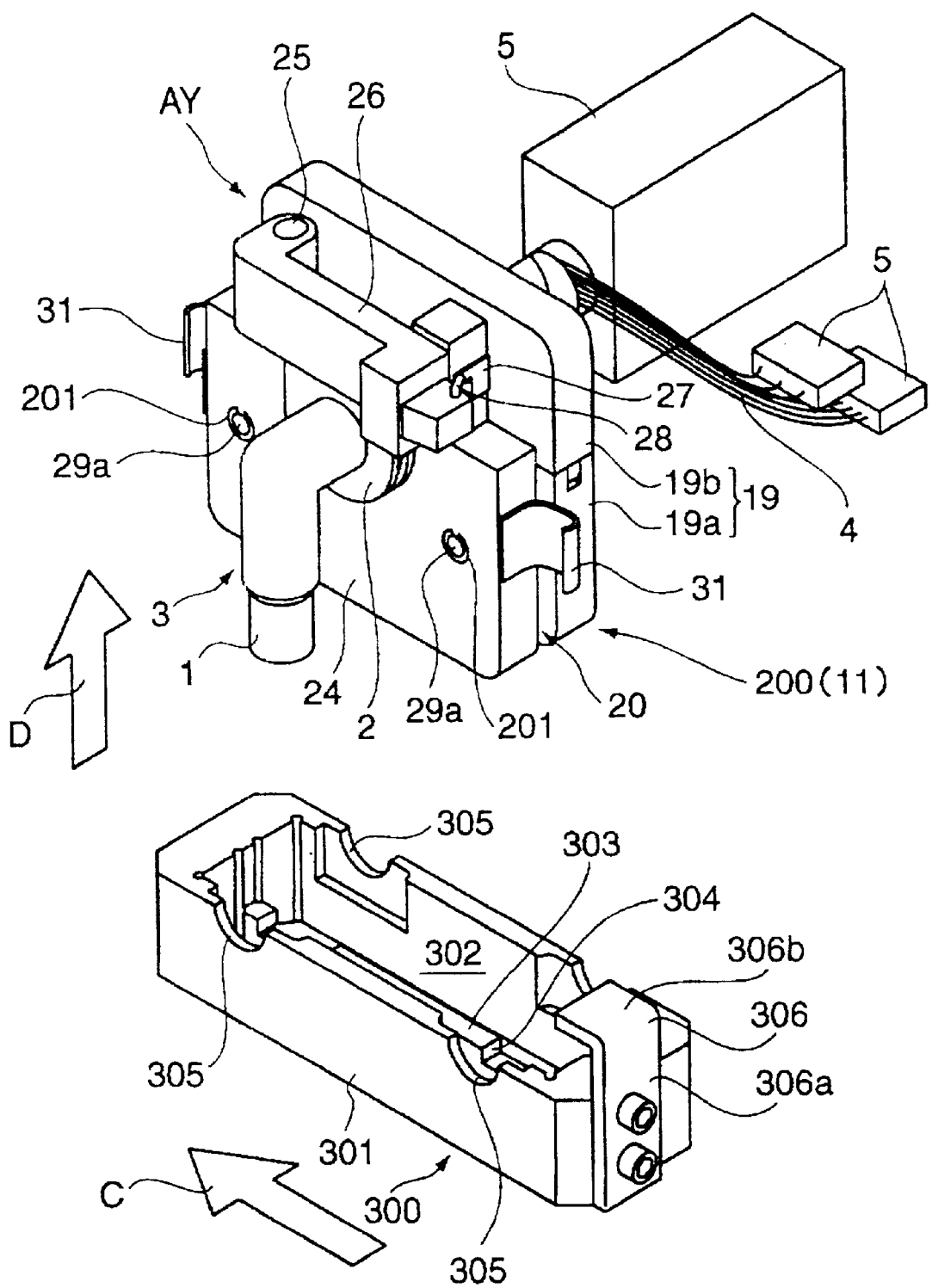
FIG. 15 is a perspective view showing the procedure of inspecting a grommet of the embodiment shown in FIG. 8.

Then, as shown with arrows C, D in FIG. 15, the assembled unit AY of the grommet 3 and the unit 200 can be removed easily from the holder 300 by displacing the assembled unit AY to the installing/removing side of the holder 300 and then pulling out the assembled unit AY therefrom.

Figure 16:
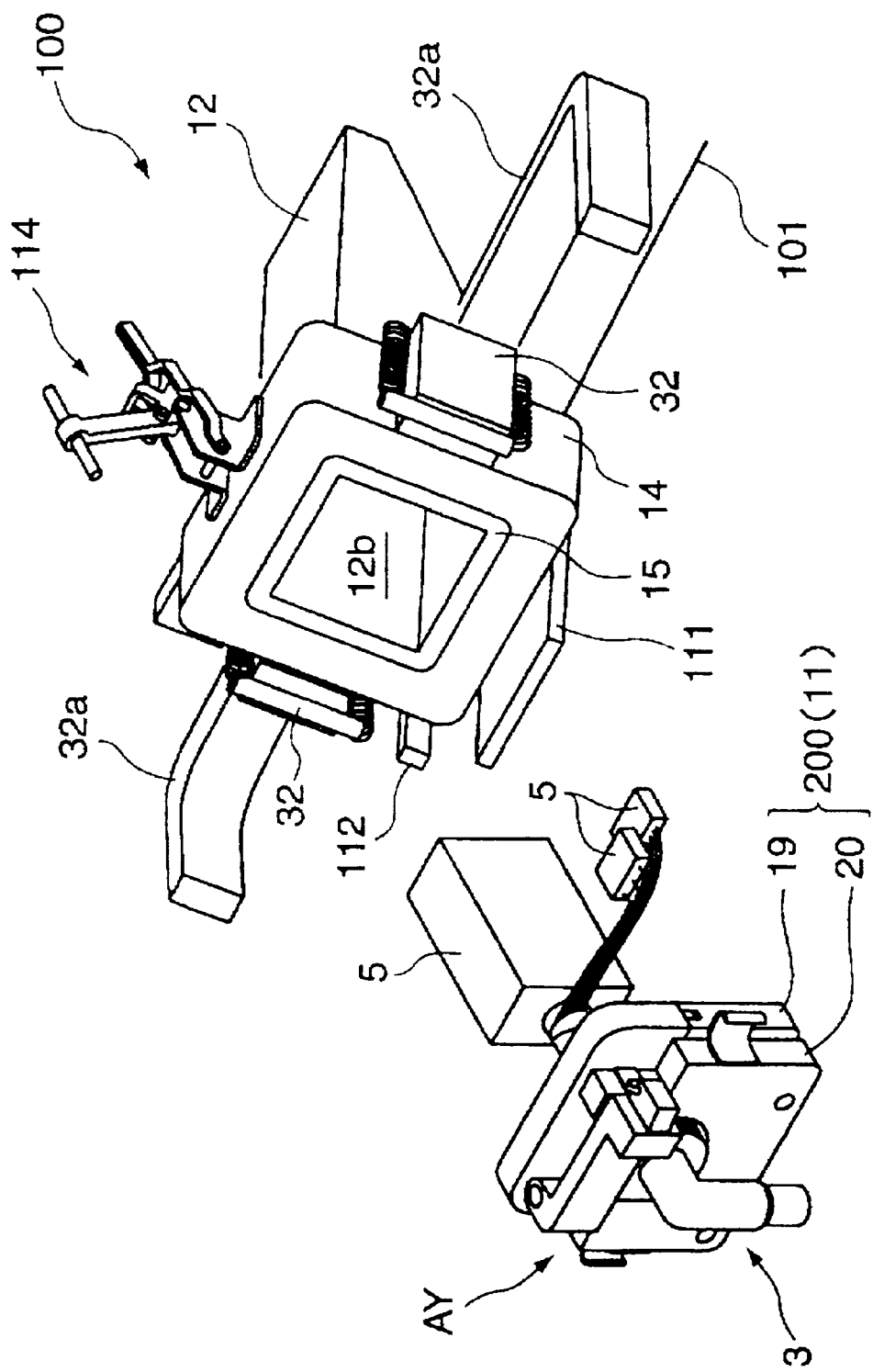
FIG. 16 is a perspective view showing the procedure of inspecting a grommet of the embodiment shown in FIG. 8.

Next, as shown in FIG. 16, the assembled unit AY is moved to the cylindrical member 100. Then, while the connectors 5 and the electric wires 4 are being introduced into the rectangular solid container 12 of the cylindrical member 100, the unit 200 of the assembled unit AY is placed in position by means of the positioning plates 111, 112.

Figure 17:
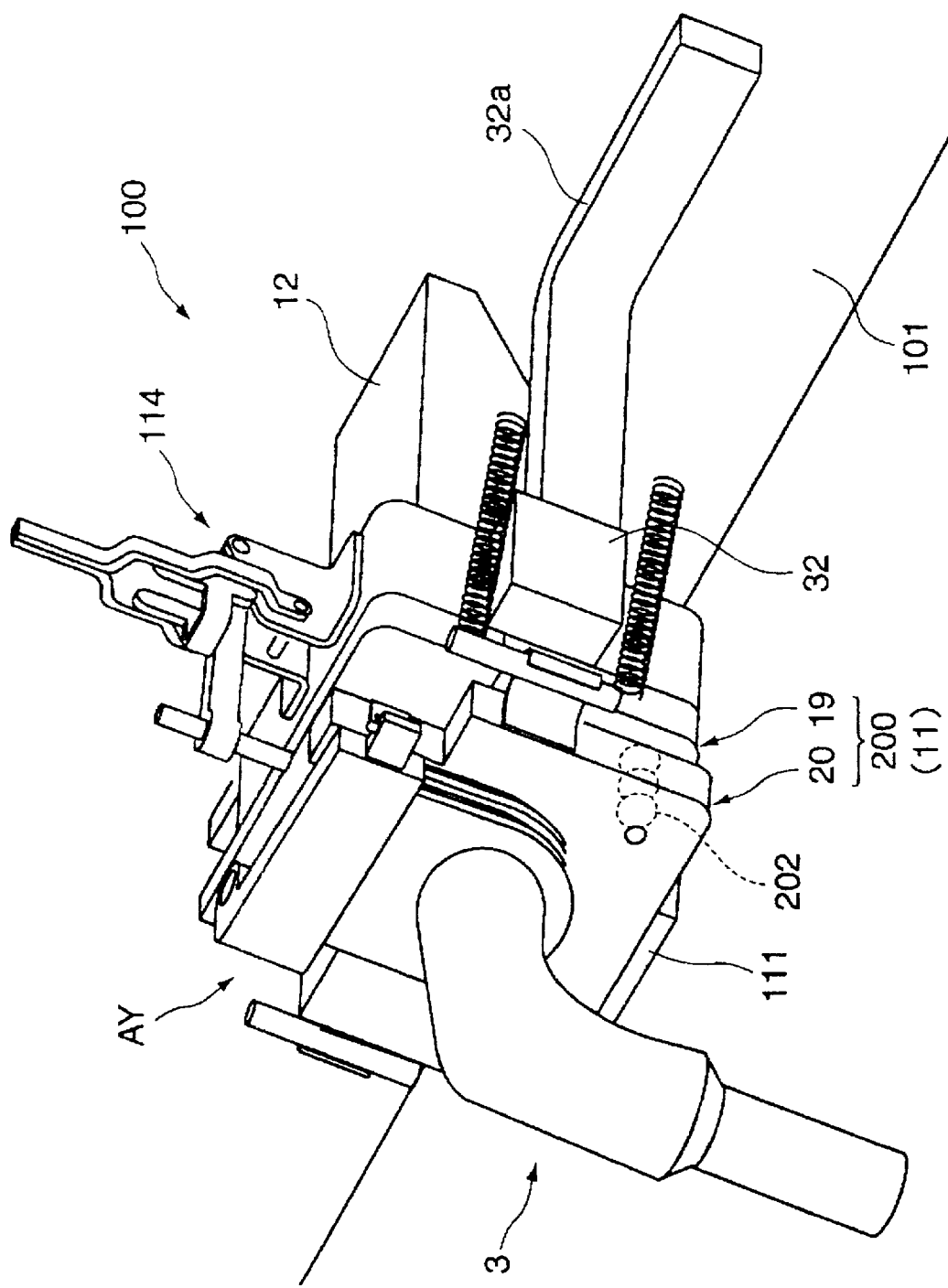
FIG. 17 is a perspective view showing the procedure of inspecting a grommet of the embodiment shown in FIG. 8.

As shown in FIG. 17, the cover 19 of the unit 200 of the assembled unit AY next is sandwiched between the toggle clamp 114 and the positioning plate 111. Then, the cover 19 is temporarily mounted on the cylindrical member 100 at a predetermined position thereof. Next, the lever 32a mounted on each side surface of the toggle clamp 114 is operated to hook the catching clips 32 to the hook 31 formed on the grommet-holding frame 20 of the assembled unit AY to thereby bring the entire assembled unit AY close to the cylindrical member 100 through the grommet-holding frame 20. Thus, in a manner similar to that of the embodiment shown in FIG. 1 and other figures, the entire assembled unit AY is fixed to the cylindrical member 100. In the embodiment shown in FIG. 8, because the grommet-holding frame 20 is brought close to the cover 19 against the urging force of the coil spring 202 (see FIG. 10), the flange 2 of the grommet 3 can be sealed with air tightness being maintained therebetween.

An inspection operation is performed to determine success or failure of the grommet 3 in a manner similar to that of the embodiment shown in FIG. 1 and other figures depending on the change of the air pressure inside the cylindrical member 100.

After the inspection is made, the assembled unit AY of the grommet 3 is removed from the cylindrical member 100 by an operation to be performed in an order reverse to that described above. In the removing operation, the coil springs 202 (see FIG. 10) between the cover 19 and the grommet-holding frame 20 urge the grommet-holding frame 20 and the cylindrical member 100 away from each other. Thus, the flange 2 of the grommet 3 and the cover 19 can be separated from each other easily, which facilitates succeeding procedures of the removing operation.

It is possible to perform an operation of disassembling the assembled unit AY (operation of removing the unit 200 from the grommet 3) with the assembled unit AY held temporarily by the holder 300. The disassembling operation is performed with the assembled unit AY placed close to the metal fitting side. Thus, in pulling out the grommet 3 from the grommet-holding frame 20, the locking metal fitting 306 prevents the grommet-holding frame 20 from slipping off upward. Thus, the grommet 3 can be removed easily from the unit 200.

In addition to the above-described embodiments, various modifications of the present invention can be made. For example, the elastic coil spring 202 may be interposed between a pair of the guide rods 29 of the embodiment shown in FIG. 1. However, the coil spring 202 can be handled easily when it is installed on the unit 200 shown in FIG. 10.

Needless to say, various modifications of the present invention can be made within the scope of the claim thereof.

As described above, according to the inspection device of the present invention, the sealing means seals the cylindrical member into which electric wires projected from the front end of the grommet are inserted. A supply of air then is supplied into the cylindrical member, and the flow rate of the air is measured to determine whether the grommet has passed an examination. Accordingly, it is possible to detect the gap between the electric wires with high accuracy and check whether a watertight seal exists in the space between the front and rear sides of the grommet.

What is claimed is:

1. A water cut-off inspection device for use with a bundle of electric wires (4) that have been inserted into a grommet (3), said grommet (3) having a front end, and said wires (4) projecting from the front end of the grommet (3), said device being operative to determine whether a watertight seal exist between gaps between the electric wires, comprising:
   a cylindrical member (10, 100) into which said electric wires (4) projecting from the front end of said grommet (3) are inserted; and
   a sealing means (11) for sealing said cylindrical member (10, 100),
   wherein air is supplied into said cylindrical member (10, 100), and wherein a determination is made whether air flow stops due to pressurization of said cylindrical member (10, 100) or whether a flow of said air is detected, for determining whether said grommet (3) has passed an examination.

2. A water cut-off inspection device according to claim 1, wherein said sealing means (11) of said cylindrical member (10, 100) includes a cover (19) having an electric wire insertion hole (22) and a grommet-holding frame (20) configured to be fitted on said front end of said grommet (3); and a catching fitting (31, 32) to press a surface of said front end of said grommet (3) against said cover (19).

3. A water cut-off inspection device according to claim 2, wherein said cover (19) comprises two parts (19); and said electric wire insertion hole (22) is formed straddlingly on said two parts (19).

4. A water cut-off inspection device according to claim 2, wherein a packing (15) is formed on a periphery of an open portion of said cylindrical member (10, 100); and a groove (23) being formed on said cover (19) for receiving said packing.

5. A water cut-off inspection device according to claim 4, wherein an elastic member (202) is interposed between said grommet-holding frame (20) and said cover (19).

6. A water cut-off inspection device according to claim 4, wherein said grommet-holding frame (20) has a press rib fitted (210) in an annular groove (2a) formed on a periphery of said front end of said grommet (3) to sandwich a front edge portion of said grommet (3) formed forward from said annular groove (2a) between said cover (19) and said press rib (210).

7. A water cut-off inspection device according to claim 2, wherein said grommet-holding frame (20) is removably connected to said cylindrical member(10, 100).

8. A holder (300) for a grommet (3) which is used in combination with the water cut-off inspection device according to claim 7, said holder (300) holding said grommet-holding frame (20) and said cover (19) temporarily such that said grommet (3) is installed on said grommet-holding frame (20) accommodated in an accommodation portion on which said unit can be installed and removed therefrom and said grommet (3) is removed from said grommet-holding frame (20).

9. An inspection device for inspecting adequacy of a waterproof seal between a grommet (3) and wires (4) inserted through the grommet (3), said device comprising:

a container (12) having a wire receptacle therein and a wire insertion opening leading to the wire receptacle, said receptacle being configured for accommodating portions of the wires (4) projecting from the grommet (3), an air supply inlet (17) communication said wire receptacle at a location spaced from said opening for delivering pressurized air to the receptacle of the container (12), a cover (19) mounted to the container (12) in proximity to the opening into said receptacle, the cover (19) being movable relative to the container (12) from an open position where said cover (19) permits insertion of said wires (4) into the receptacle of the container (12) and a closed position where the cover (19) is in sealing engagement with portions of the container (12) surrounding the opening to the receptacle; and a grommet holding frame (20) for releasable sealed engagement around an entire peripheral portion of said grommet (3), said grommet holding frame (20) being configured for releasable sealed engagement with said cover (19), whereby said sealing engagement between said container (12), said cover (19) and said grommet holding frame (20) permits pressurized air testing of the waterproof seal between the wires and the grommet by air directed through the inlet (17).

10. The inspection device of claim 9, wherein said cover (19) includes a wire insertion hole (22) formed therethrough, said grommet holding frame (20) being sealingly engageable with portions of said cover (19) surrounding said wire insertion hole (22).

11. The inspection device of claim 10, wherein said cover (19) includes two cover halves (19) hingedly connected to said container (12), portions of said wire insertion hole (22) being formed on each of said cover halves (19) opposite the respective hinged connections to the container (12).

12. A method for testing adequacy of a seal between wires (4) and a grommet (3), said method comprising:

providing a plurality of wires (4) projecting through a grommet (3) and at least partly sealed to the grommet (3);

providing a container (12) having a wire receptacle therein and an opening to the receptacle;

inserting portions of the wires (4) projecting from the grommet (3) into the receptacle of the container (12);

sealing the grommet (3) to portions of the container (12) surrounding the opening to the wire receptacle;

directing pressurized air into the wire receptacle of the container (12);

measuring air flow into the receptacle of the container (12); and generating a signal for indicating at least one of a steady state air pressure and an air flow indicative of an inadequate seal.

13. The method of claim 12, wherein the step of sealing the opening to the wire receptacle of the container comprises sealing a cover (19) to portions of the container (12) surrounding the opening to the wire receptacle, and around portions of the wires (4) passing into the wire receptacle of the container (12).

14. The method of claim 13, further comprising providing a grommet holding frame (20); sealing the grommet holding frame (20) around a peripheral portion of the grommet (3) and then sealing the grommet holding frame (20) to the cover (19).

* * * * *